US012636613B2

(12) United States Patent
Voss et al.

(10) Patent No.: US 12,636,613 B2
(45) Date of Patent: *May 26, 2026

(54) EMISSION TREATMENT CATALYSTS, SYSTEMS AND METHODS

(71) Applicant: BASF Corporation, Florham Park, NJ (US)

(72) Inventors: Kenneth E. Voss, Somerville, NJ (US); Kevin A. Hallstrom, Clinton, NJ (US); Sanath V. Kumar, Hillsborough, NJ (US); Susanne Stiebels, Adenbuttel (DE); Marius Vaarkamp, Burlington, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/675,217

(22) Filed: May 28, 2024

(65) Prior Publication Data

US 2024/0307822 A1     Sep. 19, 2024

Related U.S. Application Data

(60) Continuation of application No. 17/661,058, filed on Apr. 28, 2022, now Pat. No. 12,023,627, which is a
(Continued)

(51) Int. Cl.
*B01D 53/94* (2006.01)
*F01N 3/023* (2006.01)
(Continued)

(52) U.S. Cl.
CPC ....... *B01D 53/9418* (2013.01); *B01D 53/944* (2013.01); *B01D 53/945* (2013.01);
(Continued)

(58) Field of Classification Search
CPC .... B01D 2251/2067; B01D 2255/1021; B01D 2255/1023; B01D 2255/1025;
(Continued)

(56) References Cited

U.S. PATENT DOCUMENTS 4,329,162 A     5/1982 Pitcher
4,931,419 A     6/1990 Blanchard et al.
(Continued)

FOREIGN PATENT DOCUMENTS

CN     1832794     9/2006
JP     2005-009407     1/2005
(Continued)

OTHER PUBLICATIONS

Final Rejection issued in U.S. Appl. No. 12/330,663 dated Apr. 21, 2017.
(Continued)

*Primary Examiner* — Phutthiwat Wongwian
(74) *Attorney, Agent, or Firm* — DLA Piper LLP (US)

(57) ABSTRACT

Zoned diesel oxidation catalysts containing a higher precious metal loading in the inlet zone that the outlet zone and an equal or shorter length inlet zone are described. Emission treatment systems and methods of remediating nitrogen oxides (NOx), particulate matter, and gaseous hydrocarbons using zoned diesel oxidation catalysts are also described.

13 Claims, 10 Drawing Sheets

Related U.S. Application Data division of application No. 15/995,316, filed on Jun. 1, 2018, now Pat. No. 11,344,845, which is a continuation of application No. 12/484,710, filed on Jun. 15, 2009, now Pat. No. 9,993,771, which is a continuation-in-part of application No. 12/330,663, filed on Dec. 9, 2008, now Pat. No. 9,863,297.

(60) Provisional application No. 61/012,947, filed on Dec. 12, 2007.

(51) Int. Cl.
  *F01N 3/08* (2006.01)
  *F01N 3/20* (2006.01)

(52) U.S. Cl.
  CPC ....... *B01D 53/9495* (2013.01); *F01N 3/0231* (2013.01); *F01N 3/0821* (2013.01); *F01N 3/2066* (2013.01); *B01D 53/9477* (2013.01); *B01D 2251/2067* (2013.01); *B01D 2255/1021* (2013.01); *B01D 2255/1023* (2013.01); *B01D 2255/1025* (2013.01); *B01D 2255/9155* (2013.01); *B01D 2258/012* (2013.01); *F01N 2510/0682* (2013.01); *F01N 2570/18* (2013.01); *F01N 2610/02* (2013.01); *Y02T 10/12* (2013.01)

(58) Field of Classification Search
  CPC ...... B01D 2255/9155; B01D 2258/012; B01D 53/9418; B01D 53/944; B01D 53/945; B01D 53/9477; B01D 53/9495; F01N 2510/0682; F01N 2570/18; F01N 2610/02; F01N 3/0231; F01N 3/0821; F01N 3/2066; Y02T 10/12
  See application file for complete search history.

(56) References Cited

U.S. PATENT DOCUMENTS

| | | | |
|---|---|---|---|
| 4,961,917 | A | 10/1990 | Byrne |
| 4,963,332 | A | 10/1990 | Brand et al. |
| 5,100,632 | A | 3/1992 | Dettling |
| 5,462,907 | A | 10/1995 | Farrauto et al. |
| 5,491,120 | A | 2/1996 | Voss et al. |
| 5,516,497 | A | 5/1996 | Speronello et al. |
| 5,522,218 | A | 6/1996 | Lane et al. |
| 5,866,210 | A | 2/1999 | Rosynsky et al. |
| 5,875,057 | A | 2/1999 | Kato |
| 5,963,832 | A | 10/1999 | Srinivasan et al. |
| 6,087,298 | A | 7/2000 | Sung et al. |
| 6,415,602 | B1 | 7/2002 | Patchett et al. |
| 6,471,924 | B1 | 10/2002 | Feeley et al. |
| 6,478,874 | B1 | 11/2002 | Rosynsky et al. |
| 6,484,495 | B2 | 11/2002 | Minami |
| 6,753,294 | B1 | 6/2004 | Brisley et al. |
| 6,877,313 | B1 | 4/2005 | Phillips et al. |
| 6,904,752 | B2 | 6/2005 | Foster et al. |
| 7,078,074 | B2 | 7/2006 | Matsuzawa et al. |
| 7,097,817 | B2 | 8/2006 | Brisley et al. |
| 7,198,764 | B2 | 4/2007 | Fisher et al. |
| 7,210,288 | B2 | 5/2007 | Bandi-Konrad et al. |
| 7,229,597 | B2 | 6/2007 | Patchett et al. |
| 7,264,785 | B2 | 9/2007 | Blakeman |
| 7,534,738 | B2 | 5/2009 | Fujdala et al. |
| 7,611,680 | B2 | 11/2009 | Jia et al. |
| 7,930,881 | B2 | 4/2011 | Goersmann et al. |
| 2004/0001781 | A1 | 1/2004 | Kumar et al. |
| 2004/0040289 | A1 | 3/2004 | Mazur et al. |
| 2004/0052699 | A1 | 3/2004 | Molinier et al. |
| 2004/0258594 | A1 | 12/2004 | Andreasson et al. |
| 2005/0031514 | A1 | 2/2005 | Patchett et al. |
| 2005/0056004 | A1 | 3/2005 | Kakwani et al. |
| 2005/0069476 | A1 | 3/2005 | Blakeman et al. |

| | | | |
|---|---|---|---|
| 2005/0284138 | A1 | 12/2005 | Imai et al. |
| 2006/0010859 | A1 | 1/2006 | Yan et al. |
| 2006/0075742 | A1 | 4/2006 | Lee |
| 2006/0130458 | A1 | 6/2006 | Solbrig |
| 2006/0153761 | A1 | 7/2006 | Bandl-Konrad et al. |
| 2006/0179825 | A1 | 8/2006 | Hu et al. |
| 2007/0028604 | A1 | 2/2007 | Twigg et al. |
| 2007/0062180 | A1 | 3/2007 | Weber et al. |
| 2007/0240406 | A1 | 10/2007 | Zhang |
| 2007/0243115 | A1 | 10/2007 | Tsumagari et al. |
| 2007/0245724 | A1 | 10/2007 | Dubkov et al. |
| 2007/0251218 | A1 | 11/2007 | Driscoll et al. |
| 2007/0277507 | A1 | 12/2007 | Yan |
| 2008/0038174 | A1 | 2/2008 | Mori et al. |
| 2008/0045405 | A1 | 2/2008 | Beutel et al. |
| 2008/0141661 | A1 | 6/2008 | Voss et al. |
| 2008/0256935 | A1 | 10/2008 | Oger et al. |
| 2009/0151341 | A1 | 6/2009 | Kim et al. |
| 2009/0158719 | A1 | 6/2009 | Hallstrom et al. |
| 2009/0288402 | A1 | 11/2009 | Voss et al. |
| 2010/0101218 | A1 | 4/2010 | Gabe et al. |
| 2012/0023909 | A1 | 2/2012 | Lambert et al. |
| 2013/0061576 | A1 | 3/2013 | Gonze et al. |

FOREIGN PATENT DOCUMENTS

| | | |
|---|---|---|
| JP | 2005-042687 | 2/2005 |
| JP | 2006-070771 | 3/2006 |
| JP | 2007-501353 | 1/2007 |
| JP | 2009-007948 | 1/2009 |
| WO | 2005/016497 | 2/2005 |

OTHER PUBLICATIONS

Non-Final Rejection issued in U.S. Appl. No. 12/330,663 dated Dec. 5, 2016.

Non-Final Rejection issued in U.S. Appl. No. 12/330,663 dated Jul. 7, 2016.

Non-Final Rejection issued in U.S. Appl. No. 12/330,663 dated Apr. 17, 2013.

Non-Final Rejection issued in U.S. Appl. No. 12/330,663 dated Jan. 6, 2012.

Final Rejection issued in U.S. Appl. No. 12/484,710 dated Aug. 25, 2017.

Final Rejection issued in U.S. Appl. No. 12/484,710 dated Feb. 28, 2014.

Final Rejection issued in U.S. Appl. No. 12/484,710 dated Oct. 4, 2012.

Non-Final Rejection issued in U.S. Appl. No. 12/484,710 dated Feb. 16, 2017.

Non-Final Rejection issued in U.S. Appl. No. 12/484,710 dated Jul. 29, 2016.

Non-Final Rejection issued in U.S. Appl. No. 12/484,710 dated Jul. 9, 2013.

Non-Final Rejection issued in U.S. Appl. No. 12/484,710 dated Jun. 8, 2012.

Final Rejection issued in U.S. Appl. No. 15/995,316 dated Mar. 9, 2021.

Final Rejection issued in U.S. Appl. No. 15/995,316 dated Feb. 27, 2020.

Non-Final Rejection issued in U.S. Appl. No. 15/995,316 dated Jul. 13, 2018.

Final Rejection issued in U.S. Appl. No. 15/995,316 dated Apr. 4, 2019.

Non-Final Rejection issued in U.S. Appl. No. 15/995,316 dated Jul. 27, 2020.

Non-Final Rejection issued in U.S. Appl. No. 15/995,316 dated Aug. 8, 2019.

Johansen et al., "Novel Base Metal-Palladium Catalytic Diesel Filter Coating with NO2 Reducing Properties", *SAE Technical Paper*, 2007.

Non-Final Office Action from U.S. Appl. No. 12/330,663 mailed May 11, 2012, 15 pgs.

(56)         References Cited

OTHER PUBLICATIONS

Non-Final Office Action from U.S. Appl. No. 12/330,663 mailed Jun. 6, 2012, 14 pgs.
Final Office Action from U.S. Appl. No. 12/330,663 mailed Oct. 16, 2012, 21 pgs.
Final Office Action from U.S. Appl. No. 12/330,663 mailed Sep. 12, 2013, 28 pgs.
Final Office Action from U.S. Appl. No. 12/330,663 mailed Mar. 4, 2012, 20 pgs.

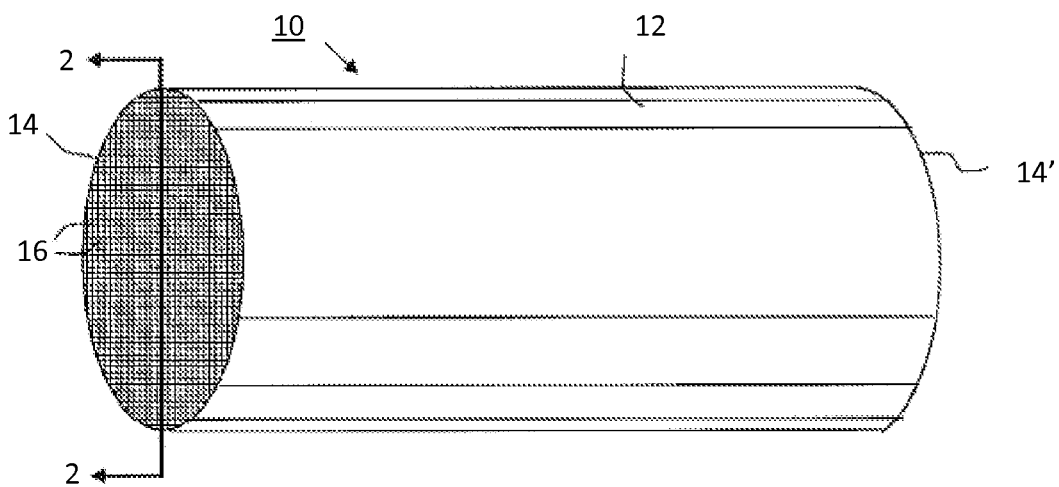
FIG. 1
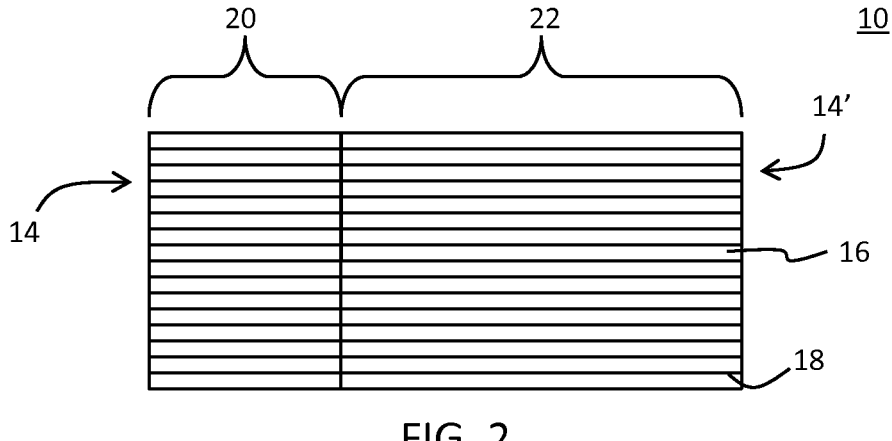
FIG. 2
FIG. 3

EMISSION TREATMENT CATALYSTS, SYSTEMS AND METHODS

BACKGROUND

The present invention relates to an emission treatment catalysts and systems having a Diesel Oxidation Catalyst (DOC) positioned upstream from a Catalyzed Soot Filter (CSF), which is positioned upstream from a Selective Catalytic Reduction (SCR) catalyst. In one or more embodiments, the system provides an effective method of simultaneously remediating the nitrogen oxides ($NO_x$), particulate matter, CO and gaseous hydrocarbons present in diesel engine exhaust streams.

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) also promote the oxidation of nitric oxide (NO) to $NO_2$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel and oil. Small proportions of $SO_3$ are formed during combustion of the diesel fuel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Provisions are generally introduced to lower the soot burning temperature in order to provide for passive regeneration of the filter. The presence of a catalyst promotes soot combustion, thereby regenerating the filters at temperatures accessible within the diesel engine's exhaust under realistic duty cycles. In this way a catalyzed soot filter (CSF) or catalyzed diesel particulate filter (CDPF) is effective in providing for >80% particulate matter reduction along with passive burning of the accumulating soot, and thereby promoting filter regeneration.

Future emissions standards adopted throughout the world will also address $NO_x$ reductions from diesel exhaust. A proven $NO_x$ abatement technology applied to stationary sources with lean exhaust conditions is Selective Catalytic Reduction (SCR). In this process, $NO_x$ is reduced with ammonia ($NH_3$) to nitrogen ($N_2$) over a catalyst typically composed of base metals. The technology is capable of $NO_x$ reduction greater than 90%, and thus it represents one of the best approaches for achieving aggressive $NO_x$ reduction goals. SCR is under development for mobile applications, with urea (typically present in an aqueous solution) as the source of ammonia. SCR provides efficient conversions of $NO_x$ as long as the exhaust temperature is within the active temperature range of the catalyst, the operating window.

New emission regulations for diesel engines around the world are forcing the use of more advanced emission controls systems. These systems will need to reduce both total particulate matter and $NO_x$ by about 90 percent. The engine manufacturers have multiple emission system options to meet the new regulations but one option is the combination of an active filter system for particulate reduction and a selective catalytic reduction system.

One system configuration that has been proposed in the literature involves a diesel oxidation catalyst (DOC) positioned downstream from the engine, a catalyzed soot filter (CSF) positioned downstream from the DOC, a reductant injection system position downstream from the CSF, a selective catalytic reduction (SCR) catalyst positioned downstream from the reductant injection system, and an optional ammonia oxidation (AMOX) catalyst positioned downstream from the SCR catalyst. The system also typically includes a hydrocarbon injection system located downstream from the engine and upstream from the DOC.

This system configuration offers several advantages for the overall system functionality. Having the DOC in the first position allows it to be placed as close as possible to the engine ensuring rapid heat up for cold start HC and CO emissions and the maximum DOC inlet temperature for active filter regeneration. The CSF being in front of the SCR will prevent particulate, oil ash and other undesirable materials from being deposited on the SCR catalyst thus improving its durability and performance. Having oxidation catalysts in front of the SCR allows for an increase in the $NO_2$ to NO (or $NO_2$ to $NO_x$ ratio entering the SCR which is known to increase the reaction rate of the NOx reduction occurring in the SCR if properly controlled. An example of such a system is described in United States Patent Application Publication Number 2005/0069476.

There is an ongoing need to investigate and provide alternative system strategies to improve the treatment of exhaust gas streams containing NOx and particulate matter.

SUMMARY OF THE INVENTION

Applicants have determined that in systems such as the type in which a DOC is located upstream from a CSF, which is located upstream from an SCR catalyst, the optimal control of the NO to $NO_2$ ratio entering the filter can be an issue with the large volume of oxidation catalyst that is present in the DOC and CSF in front of the SCR. According to one or more embodiments of the invention, better control of the NO to $NO_2$ ratio of the exhaust gas flowing into the SCR is provided by using a novel diesel oxidation catalyst.

Embodiments of the invention are directed to diesel oxidation catalysts comprising an inlet zone with an axial length and an outlet zone with an axial length. The inlet zone comprises at least one of platinum and palladium in a first loading. The outlet zone comprises palladium in a second loading. The outlet zone comprises substantially no platinum. The first loading being greater than the second loading and the axial length of the inlet zone being less than or equal to the axial length of the outlet zone.

In some embodiments, upon passing an exhaust stream through the catalyst, substantially no additional $NO_2$ is produced over about 90% of the operating window of the catalyst.

In some embodiments, the axial length of the inlet zone is about half the axial length of the outlet zone. In other embodiments, the axial length of the inlet zone is about equal to the axial length of the outlet zone. In further embodiments, the axial length of inlet zone is at least about 10% of the total length of the catalyst. In additional embodiments, the axial length of the inlet zone is at least about 20% of the total length of the catalyst. In various embodiments, the total length of the inlet zone is at least about 40% of the total length of the catalyst. In other embodiments, the axial length of the inlet zone is less than about 35% of the total length of the catalyst.

According to one or more embodiments, the inlet zone has a platinum to palladium ratio equal to or greater than about 10:1.

In some embodiments, the first loading is greater than about 30 g/ft3. In some embodiments, the second loading is less than about 30 g/ft3.

The catalyst of one or more embodiments is disposed on a flow-through substrate.

In some embodiments, one or more of the inlet zone and the outlet zone further comprises a base metal oxide. In some embodiments, one or more of the inlet zone and the outlet zone further comprises ceria.

According to various embodiments, the inlet zone comprises platinum and palladium in a ratio of at least 2:1 and the outlet zone comprises substantially only palladium.

In detailed embodiments, the inlet zone comprises platinum and palladium in a ratio of about 10:1 with a loading of about 80 g/ft3 and the outlet zone comprises substantially only palladium with a loading of about 5 g/ft3.

In specific embodiments, the inlet zone and the outlet zone comprise substantially only palladium.

In detailed embodiments, one or more of the inlet zone and the outlet zone further comprises rhodium.

Additional embodiments of the invention are directed to methods of treating an exhaust stream from a diesel engine comprising $NO_x$ and particulate matter. The method comprising flowing the exhaust stream through the catalyst described herein. Briefly, a diesel oxidation catalysts comprising an inlet zone with an axial length and an outlet zone with an axial length. The inlet zone comprises at least one of platinum and palladium in a first loading. The outlet zone comprises palladium in a second loading. The outlet zone comprises substantially no platinum. The first loading being greater than the second loading and the axial length of the inlet zone being less than or equal to the axial length of the outlet zone. In detailed embodiments, the catalyst is effective to produce substantially no additional $NO_2$ in the exhaust gas stream after passing through the catalyst over about 90% of the operating window of the catalyst.

Further embodiments of the invention are directed to methods of making a diesel oxidation catalyst. A first slurry comprising platinum and palladium is prepared. A second slurry comprising palladium is prepared. A inlet zone of a substrate is washcoated with the first slurry to a first loading, the inlet zone having an axial length. An outlet zone of the substrate is washcoated with the second slurry to a second loading, the outlet zone having an axial length. The first loading is greater than the second loading and the axial length of the inlet zone is less than or equal to the axial length of the outlet zone.

Other embodiments of the invention are directed to systems for treating an exhaust stream comprising $NO_x$ from an engine. The system comprises the diesel oxidation catalyst described herein being disposed downstream of the engine.

In some detailed embodiments, the system further comprising a catalyzed soot filter disposed downstream of the diesel oxidation catalyst. The catalyzed soot filter having a plurality of longitudinally extending passages bounded by longitudinally extending walls. The passages comprising inlet passages having an open inlet end and a closed outlet end, and outlet passages having a closed inlet end and an open outlet end. The catalyzed soot filter comprising a catalyst composition on the walls. The catalyzed soot filter effective to optimize the ratio of NO to $NO_2$ exiting the filter.

In some detailed embodiments, the system further comprises a selective catalytic reduction catalyst disposed downstream of the catalyzed soot filter.

BRIEF DESCRIPTION OF THE DRAWINGS

FIG. 1 shows a perspective view of a flow through honeycomb substrate;

FIG. 2 is a cross-sectional view taken along line 2-2 of FIG. 1;

FIG. 3 shows a cross-sectional view of a zone-coated channel of a flow-through substrate according to an embodiment of the invention;

DETAILED DESCRIPTION OF THE INVENTION

Figure 4:
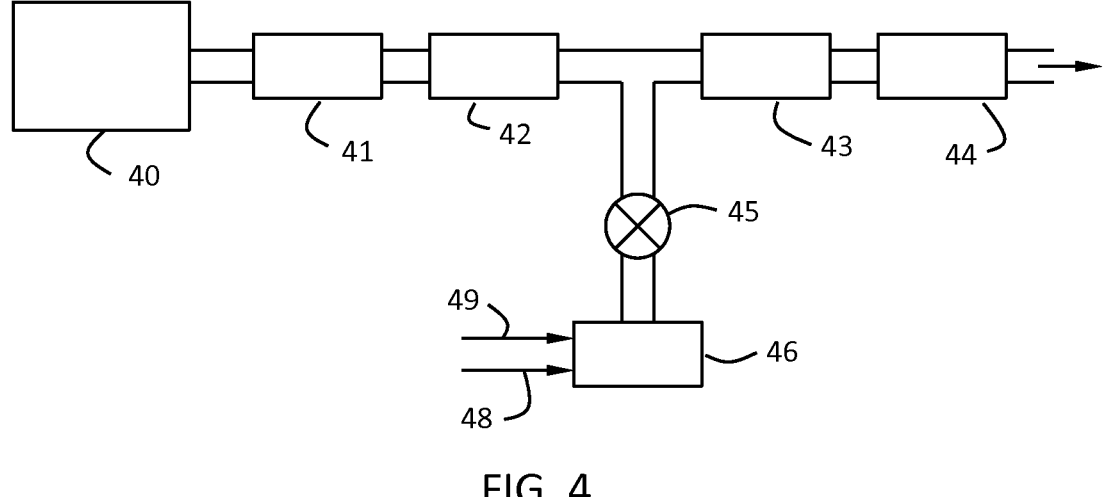
FIG. 4 is a schematic depiction of an emission treatment system according to an embodiment of the invention.

Before describing several exemplary embodiments of the invention, it is to be understood that the invention is not limited to the details of construction or process steps set forth in the following description. The invention is capable of other embodiments and of being practiced or being carried out in various ways.

"Activated alumina" has its usual meaning of a high BET surface area alumina, comprising one or more of gamma-, theta- and delta aluminas.

"BET surface area" has its usual meaning of referring to the Brunauer, Emmett, Teller method for determining surface area by $N_2$ absorption. Unless otherwise specifically stated, all references herein to the surface area of the catalyst support components or other catalyst components means the BET surface area.

"Bulk form," when used to describe the physical form of a material (e.g., ceria), means the material is present as discrete particles that can be as small as 1 to 15 microns in diameter or smaller, as opposed to having been dispersed in solution onto another material such as gamma alumina. By way of example, in some embodiments of the invention, particles of ceria are admixed with particles of gamma alumina so that ceria is present in bulk form, as opposed to, for example, impregnating alumina particles with aqueous solutions of ceria precursors which upon calcination are converted to ceria disposed on the alumina particles.

When present in a catalyst, "cerium component" means one or more oxides of cerium (e.g., $CeO_2$).

"Downstream" and "Upstream," when used to describe an article, catalyst substrate or zone, refer to the relative positions in the exhaust system as sensed in the direction of the flow of the exhaust gas stream. When a catalyst or catalyst zone is "downstream" or "upstream" from another catalyst or zone, it may be on a different substrate or brick or on a different region of the same substrate or brick.

"High surface area support" means support materials with a BET surface area that is approximately greater than 10 $m^2/g$, for example, greater than 150 $m^2/g$.

"Platinum group metal component" or "PGM" refers to the platinum group metals or oxides thereof. Suitable platinum group metal components are platinum, palladium, rhodium iridium components, and combinations thereof.

"Diesel oxidation catalyst" or "DOC" refers to a catalyst promoting oxidation processes in diesel exhaust, to reduce emissions of the organic fraction of diesel particulates, gas-phase hydrocarbons, and/or carbon monoxide.

"Active regeneration" refers to the introduction of a combustible material (e.g., diesel fuel) into the exhaust and burning it across an oxidation catalyst to generate an exotherm from that provides heat (e.g. about 500-700° C.) needed to burn particulate matter such as soot from the filter.

An ammonia destruction catalyst or AMOX refers to a catalyst that promotes the oxidation of $NH_3$.

"Particulate filter" or "soot filter" is a filter designed to remove particulate matter from an exhaust gas stream such as soot, and particulate filters include, but are not limited to honeycomb wall flow filters, partial filtration filter, a wire mesh filter, wound fiber filters, sintered metal filters; and foam filters.

As used herein, "operating window" refers to the temperature and space velocity values encountered by the catalytic component during operation of the engine. The temperature of the operating window can vary between 0° C. and 800° C., and the space velocity can vary between 0 and 1,000,000/hour.

To meet future Heavy Duty emission regulations around the world it will be necessary to utilize particulate reduction and $NO_x$ reduction emission control system. One approach is the utilization of an active particulate filter system plus a Selective Catalytic Reduction system. This system can be configured in numerous ways but a configuration in the following order—Diesel Oxidation Catalyst (DOC)—Catalyzed Soot Filter (CSF)—Urea Injection—Selective Catalytic Reduction Catalyst (SCR)—with or without an Ammonia Oxidation Catalyst (AMOX) seems to offer attractive design benefits.

Embodiments of this invention utilize a DOC that is specifically designed to burn fuel for active regeneration of the filter by fuel injection either in-cylinder in the engine or post injection in the exhaust with minimal or no $NO_2$ production across the DOC such that $NO_2$ DOC out has negligible or no affect on particulate oxidation in the filter. The CSF can be designed to optimize the $NO/NO_2$ ratio out of the filter to facilitate optimal $NO_x$ reduction across the SCR system.

According to one or more embodiments of the invention a diesel oxidation catalyst ix disposed on a flow through substrate. FIGS. 1 to 3 illustrate a honeycomb flow through substrates that can be used according to embodiments of the invention. The catalysts comprise a substrate 10 which has an outer surface 12, and inlet end 14 and an outlet end 14'. Wall elements 18 define a plurality of parallel passages 16. Each passage 16 has a corresponding inlet and outlet. A catalyst is associated with the wall elements 18 so that the gases flowing through the passages 16 contact the catalyst. Referring to FIG. 3, according to one or more embodiments, the substrate 10 has at least two zones; an inlet zone 20 and an outlet zone 22. In one or more embodiments, the inlet zone 20 has an axial length and includes one or more of platinum and palladium in a first loading 24. The outlet zone 22 has an axial length and palladium in a second loading 26. In one or more embodiments, the first loading 24 is greater than the second loading 26 and the axial length of the inlet zone 20 is equal to or less than the axial length of the outlet zone 22.

According to one or more embodiments, the catalyst is effective to provide substantially no additional $NO_2$ when an exhaust gas stream is passed through the catalyst. Substantially no $NO_2$ is produced over about 90% of the operating window of the catalyst. In detailed embodiments, the catalyst is effective to provide substantially no additional $NO_2$ when exhaust gas is passed through the catalyst over about 70%, 75% 80%, 85%, 90% or 95% of the operating window of the catalyst. According to one or more embodiments, as used in this specification, and the appended claims, "substantially no additional $NO_2$" means that there is no more than a 25 ppm increase in the $NO_2$ concentration.

In specific embodiments, the outlet zone 22 comprises substantially no platinum. As used in this specification, and the appended claims, "substantially no platinum" means that the platinum is not intentionally provided in the zone, for example, less than about 1 wt. % of the metal comprises platinum. In specific embodiments, the amount of platinum present is less than about 0.5 wt. % or less than about 0.1 wt. %.

The axial length of the inlet zone 20 can be adjusted as needed. In specific embodiments the axial length of the inlet zone 20 is less than about 45% of the total axial length of the catalyst. In other specific embodiments, the axial length of the inlet zone 20 is less than about 40%, 35%, 30%, 25%, 20%, 15%, 10%, 5% or 1%. In detailed embodiments, the axial length of the inlet zone is about half the axial length of the outlet zone; meaning the inlet axial length is about 33.3% of the total axial length of the catalyst 10 and the outlet axial length is about 66.7% of the total axial length. In other detailed embodiments, the axial length of the inlet zone 20 can be about 0%, or greater than about 5%, 10%, 15%, 20%, 25%, 30%, 33.3%, 35%, 40% or 45% of the total axial length.

In some specific embodiments, the inlet zone 20 has a platinum to palladium ratio equal to or greater than about 10:1. In another specific embodiment, the inlet zone 20 comprises substantially only palladium. As used in this specification, and the appended claims, the term "substantially only palladium" means that there is less than about 5% of other metals. In other detailed embodiments, the inlet zone 20 has a platinum to palladium ratio greater than or equal to about 1:1, 2:1, 3:1, 4:1, 5:1, 6:1, 7:1, 8:1, 9:1, 10:1, 15:1, 20:1, 30:1, 40:1 or 50:1.

In detailed embodiments, the loading of the inlet zone is high, compared to the loading of the outlet zone. In specific embodiments, the loading of the inlet zone is equal to or greater than about 30 g/ft³, 40 g/ft³, 50, g/ft³, 60 g/ft³, 70 g/ft³, 75 g/ft³, 80 g/ft³, 90 g/ft³, 100 g/ft³, 100 g/ft³, and 150 g/ft³.

In detailed embodiments, the loading of the outlet zone is low, compared to the loading of the inlet zone. In specific embodiments, the loading of the outlet zone is less than or equal to about 30 g/ft³, 20 g/ft³, 15 g/ft³, 10 g/ft³, 5 g/ft³, 4 g/ft³, 3 g/ft³, 2 g/ft³ or 1 g/ft³.

In specific embodiments, the diesel oxidation catalyst is disposed on a flow-through substrate like that depicted in FIGS. 1-3. It is also conceivable that the diesel oxidation catalyst can be integrated with additional components, such as a particulate filter.

The diesel oxidation catalyst of some embodiments includes a base metal oxide in either or both of the inlet zone and the outlet zone. Suitable base metal oxides include, but are not limited to, oxides of rare earth metals such as ceria, praseodymia, neodymia and combinations thereof. These rare earth oxides may be stabilized by zirconia.

In a specific embodiment, the inlet zone of the diesel oxidation catalyst comprises platinum and palladium in a ratio of at least 2:1 with a loading of at least about 75 g/ft³. The outlet zone comprises substantially only palladium with a loading of no greater than about 10 g/ft³.

In another specific embodiment, the inlet zone comprises platinum and palladium in a ratio of about 10:1 with a loading of about 80 g/ft³ and the outlet zone comprises substantially only palladium with a loading of about 5 g/ft³.

In a further specific embodiment, the inlet zone and the outlet zone comprise substantially only palladium. The loading of the inlet zone is greater than 30 g/ft³ and the loading of the outlet zone is less than 30 g/ft³.

Other metals may be included in either or both zones of the diesel oxidation catalyst. Suitable metals include, but are not limited to, rhodium and an alkaline earth metal oxides such as magnesium oxide, calcium oxide, strontium oxide, barium oxide and combinations thereof.

Other aspects of the invention are directed to methods of making a diesel oxidation catalyst. A first slurry is prepared comprising one or more of platinum and palladium. A second slurry is prepared comprising palladium. A substrate is washcoated with the first slurry over an inlet zone of the substrate to result in a first loading. The inlet zone has a first axial length. The outlet zone of the substrate is washcoated with the second slurry to a second loading. The outlet zone having a second axial length. The first loading is greater than the second loading and the axial length of the inlet zone is not greater than about the axial length of the outlet zone.

In detailed embodiments, the axial length of the inlet zone is about half the axial length of the outlet zone. In other detailed embodiments the axial length of the inlet zone is about equal to the axial length of the outlet zone. The axial length of the inlet zone can be any percentage of the length of the substrate up to a length of about 50%. For example, the axial length of the inlet zone can be 5%, 10%, 20, 30%, 33.3%, 35%, 40%, 45% or 50%. These are merely examples and should not be taken as limiting the scope of the invention.

In other detailed embodiments, the first loading is greater than about 40 g/ft³. The first loading can be greater than other amounts, including, but not limited to, 50 g/ft³, 60 g/ft³, 70 g/ft³, 80 g/ft³, 90 g/ft³, 100 g/ft³, 110 g/ft³, 120 g/ft³, 130 g/ft³, 140 g/ft³, 150 g/ft³, 160 g/ft³, 170 g/ft³, 180 g/ft³, 190 g/ft³ and 200 g/ft³. These are merely examples and should not be taken as limiting the scope of the invention.

In further detailed embodiments, the second loading is less than about 20 g/ft³. The second loading can also be less than about 15 g/ft³, 10 g/ft³, 9 g/ft³, 8 g/ft³, 7 g/ft³, 6 g/ft³, 5 g/ft³, 4 g/ft³, 3 g/ft³, 2 g/ft³ and 1 g/ft³. These are merely examples and should not be taken as limiting the scope of the invention.

Further embodiments of the invention relate to an emission treatment system that effectively provides simultaneous treatment of the particulate matter, the $NO_x$ and other gaseous components of diesel engine exhaust. Due to the choice of catalytic compositions implemented in the system, effective pollutant abatement is provided for exhaust streams of varying temperatures. This feature is advantageous for operating diesel vehicles under varying loads and vehicle speeds which significantly impact exhaust temperatures emitted from the engines of such vehicles.

One embodiment of the inventive emission treatment system is schematically depicted in FIG. 4. As can be seen in FIG. 4, the exhaust containing gaseous pollutants (including unburned hydrocarbons, carbon monoxide and $NO_x$) and particulate matter is conveyed from the engine 40 to an oxidation catalyst 41. In the oxidation catalyst 41, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the optional soot filter 42 (i.e., clogging), which is positioned downstream in the system. In addition, substantially no $NO_2$ is generated in the oxidation catalyst. For instance, the amount of $NO_2$ entering the oxidation catalyst is substantially the same or less than the amount exiting the oxidation catalyst.

Accordingly, one or more embodiments are directed to a system for treating an exhaust stream comprising NO from an engine. The system comprises a diesel oxidation catalyst, as previously described, disposed downstream of the engine. Briefly, a diesel oxidation catalyst having an inlet zone with a first loading of at least one of palladium and platinum and an outlet zone with a second loading comprising palladium. The first loading is greater than the second loading and the length of the first zone is no greater than the length of the second zone.

The exact catalyst composition and loading providing that regulates the amount of $NO_2$ exiting the oxidation catalyst will depend on the particular application and factors such as whether the engine is a heavy duty diesel engine, a light duty diesel engine, the operating temperature, space velocity and other factors. Suitable catalysts for the oxidation include platinum group metal- and base metal-based compositions. The catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal. The oxidation catalyst may remove some of the particulate matter from the exhaust stream upstream of the wall flow filter, since the reduction in the particulate mass on the filter potentially extends the time before forced regenerations.

One suitable oxidation catalyst composition that may be used in the emission treatment system contains a platinum group metal (PGM) component (e.g., platinum, palladium or rhodium components) dispersed on a high surface area, refractory oxide support (e.g., γ-alumina) which is combined with a zeolite component (for example, a beta zeolite).

Zeolites used in such compositions are resistant to sulfur poisoning, sustain a high level of activity for the SCR process, and are capable of oxidation of excess ammonia with oxygen. Specific, non-limiting examples of such zeolites include USY, Beta and ZSM-20. Additional examples of suitable SCR catalysts include zeolite having the CHA structure, for example SSZ-13, and non-zeolitic molecular sieves having the CHA structure, for example silicoaluminophosphates such as SAPO-34, SAPO-18, SAPO-44. Particular, non-limiting examples are materials having the CHA structure that are promoted with Cu and/or Fe, for example Cu/SSZ-13 and Cu/SAPO-34, Cu/SAPO-18 and CuSAPO-44.

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 $m^2/g$ and consist essentially of a bulk second metal oxide which may be one or more of titania, zirconia, ceria-zirconia, silica, alumina-silica, and α-alumina.

In specific embodiments, the outlet zone of the catalyst comprises substantially no platinum. In other specific embodiments, the axial length of the inlet zone is less than about 35% of the total length of the catalyst. In other embodiments, the emission treatment system further comprises a catalyzed soot filter 42 disposed downstream of the diesel oxidation catalyst 41. In specific embodiments, the catalyzed soot filter 42 may have a plurality of longitudinally extending passages bounded by longitudinally extending walls. The passages comprise inlet passages having an open inlet end and a closed outlet end, and outlet passages having a closed inlet end and an open outlet end. The catalyzed soot filter 42 comprises a catalyst composition on the walls and is effective to optimize the ratio of NO to $NO_2$ exiting the filter.

The exhaust stream is conveyed to the soot filter 42. On passing through the soot filter 42, particulate matter is filtered and the gas contains approximately equal ratios of NO to $NO_2$.

The particulate matter including the soot fraction and the VOF are also largely removed (greater than 80%) by the soot filter 42. The particulate matter deposited on the soot filter 42 is combusted through the regeneration of the filter, the temperature at which the soot fraction of the particulate matter combusts is lowered by the presence of the catalyst composition disposed on the soot filter.

In the embodiment show in FIG. 4, an optional reductant, in this case ammonia, is injected as a spray via a nozzle (not shown) into the exhaust stream downstream of the soot filter 42. Aqueous urea shown on one line 48 can serve as the ammonia precursor which can be mixed with air on another line 49 in a mixing station 46. Valve 45 can be used to meter precise amounts of aqueous urea which are converted in the exhaust stream to ammonia.

Downstream of the soot filter 42 is a selective catalytic reduction catalyst (SCR) 43. The exhaust gas containing NO and $NO_2$ is reduced to N2 in the SCR 43.

The emission treatment system may optionally be equipped with a slip oxidation catalyst 44 downstream of the SCR catalyst 43. The slip oxidation catalyst can be coated, for example, with a composition containing base metals and less than 0.5 wt % of platinum. This provision can be used to oxidize any excess $NH_3$ before it is vented to the atmosphere.

The configuration shown in FIG. 4 offers several advantages for the overall system functionality. First, having the DOC 41 in the first position allows it to be placed as close as possible to the engine 40 ensuring rapid heat up for cold start HC and CO emissions and the maximum DOC inlet temperature for active filter regeneration.

Second, the CSF 42 being in front of the SCR 43 will prevent particulate, oil ash and other undesirable materials from being deposited on the SCR catalyst thus improving its durability and performance.

Third, having oxidation catalysts 41 in front of the SCR 43 allows for an increase in the NO$_2$ to NO ratio entering the SCR 43 which is known to increase the reaction rate of the NO$_x$ reduction occurring in the SCR 43, if properly controlled.

However, the optimal control of the NO to NO$_2$ ratio entering the filter 42 can be an issue with the large volume of oxidation catalyst that is present in the DOC 41 and CSF 42 in front of the SCR 43. According to one or more embodiments, proper system design provides for the control of the NO to NO$_2$ ratio into the SCR 43 using a novel combination of DOC 41 and diesel filter catalysts 42.

Selective Catalytic Reduction Catalysts

Suitable SCR catalyst compositions for use in the system are able to effectively catalyze the reduction of the NO$_x$ component, so that adequate NOx levels can be treated even under conditions of low load which typically are associated with lower exhaust temperatures. In one or more embodiments, the catalyst article is capable of converting at least 50% of the NOx component to N2, depending on the amount of reductant added to the system. In addition, SCR catalyst compositions for use in the system are also ideally able to aid in the regeneration of the filter by lowering the temperature at which the soot fraction of the particulate matter is combusted. Another desirable attribute for the composition is that it possesses the ability to catalyze the reaction of 02 with any excess NH3 to N2 and H2O, so that NH3 is not emitted to the atmosphere.

Useful SCR catalyst compositions used in the system also have thermal resistance to temperatures greater than 650° C. Such high temperatures are often encountered during the regeneration of soot filters. Additionally, SCR catalyst compositions should resist degradation upon exposure to sulfur components, which are often present in diesel exhaust gas compositions.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, a specific example being from about 1 to 5 percent by weight, of the total weight of promoter plus zeolite. In addition to their ability to catalyze the reduction of NOx with NH3 to N2, the disclosed compositions can also promote the oxidation of excess NH3 with O2, especially for those compositions having higher promoter concentrations.

Substrates

Substrates of particular use with the diesel oxidation catalysts and optional exhaust components described are of the flow-through type, open-cell foam filters and the wall flow type. The flow-through type substrate has been previously described with respect to FIGS. 1-3.

Figure 5:
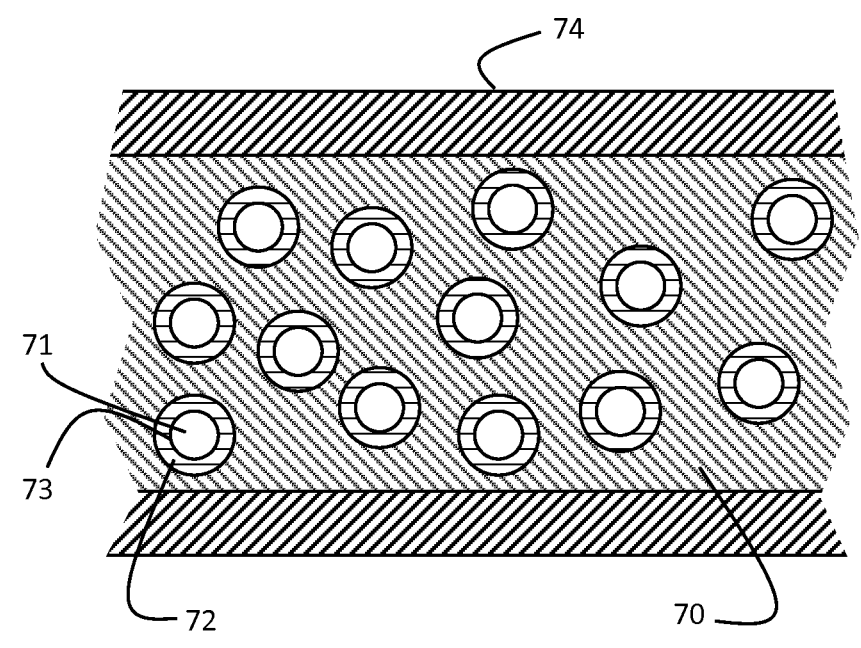
FIG. 5 shows a cross-sectional view of an open-cell foam filter substrate according to an embodiment of the invention.

An alternate substrate is an open cell foam substrate that contains a plurality of pores. FIG. 5 illustrates a cutaway section of a typical substrate of the foam-type. The foam 70 is an open-celled foam and the catalyst coating 72 is deposited on the walls 72 of the cells 71. The open-celled structure of the foam provides the coated substrate with a high surface area of the catalyst per volume. An exhaust stream passing the substrate from the inlet end to the outlet end of the substrate flows through the plurality of cells defined by the walls 74 of the foam to contact the catalyst layer 72 deposited on the walls 73 of the cells 71.

The foam substrate may be composed of metallic or ceramic materials. Examples of ceramic foams are disclosed in U.S. Pat. No. 6,077,600, which is herein incorporated by reference in its entirety. Ceramic foam carriers have walls formed from fibers coated with ceramic materials. Substrates in the form of metal foams are well known in the prior art, e.g., sec U.S. Pat. No. 3,111,396, which is herein incorporated by reference in its entirety.

Other alternate substrate are wall flow substrates useful for supporting the catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. An example of a suitable wall flow substrate has a wall thickness of between about 0.002 and 0.015 inches.

Figure 6:
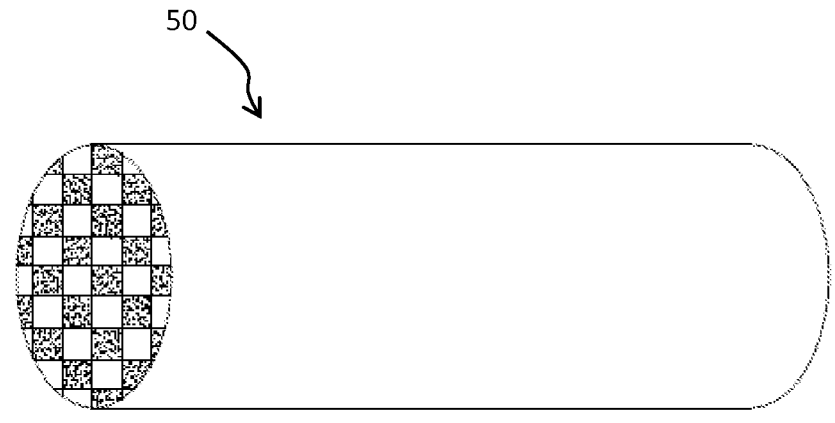
FIG. 6 shows a perspective view of a wall flow filter substrate.
Figure 7:
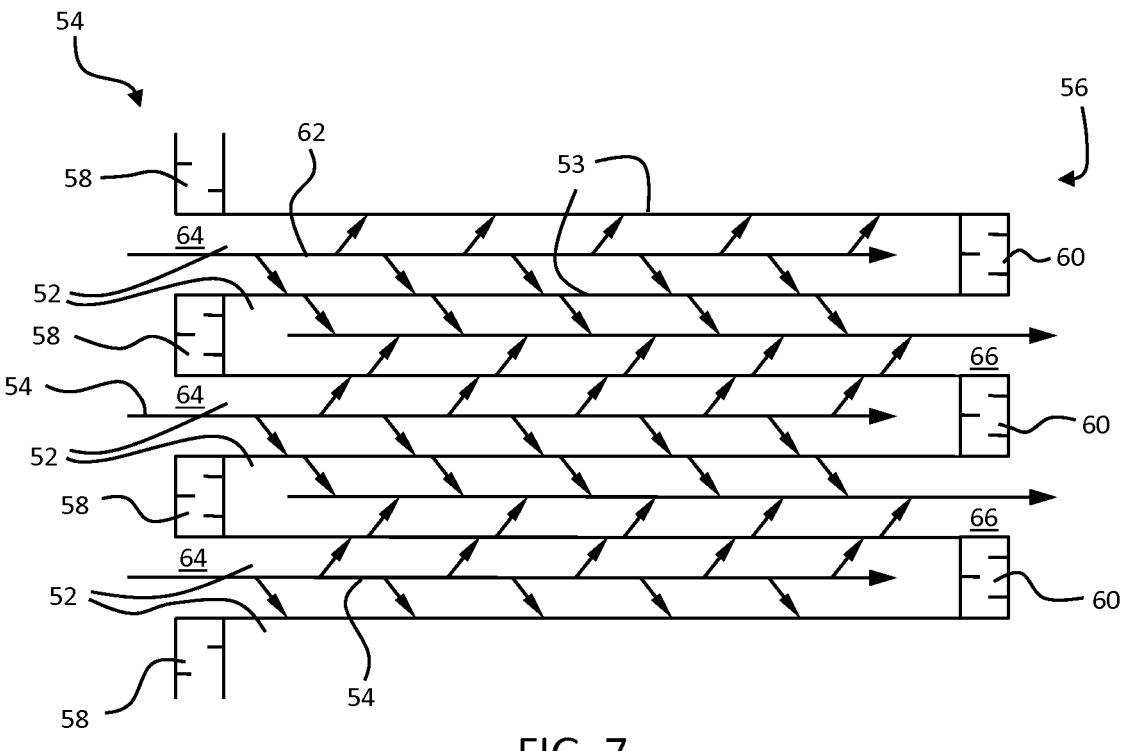
FIG. 7 shows a cutaway view of a section of a wall flow filter substrate.

FIGS. 6 and 7 illustrate a wall flow filter substrate 50 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Suitable wall flow filter substrates are composed of ceramic-like materials such as cordierite, α-alumina, silicon carbide, silicon nitride, zirconia, mullite, spodumene, alumina-silica-magnesia, aluminum titanate or zirconium silicate, or of any other suitable porous, refractory metal. Wall flow substrates may also be formed of ceramic fiber composite materials. Suitable wall flow substrates are formed from cordierite and silicon carbide. Such materials are able to withstand the environment, particularly high temperatures, encountered in treating the exhaust streams.

Suitable wall flow substrates for use in the inventive system include thin porous walled honeycombs (monoliths) through which the fluid stream passes without causing too great an increase in back pressure or pressure across the article. Normally, the presence of a clean wall flow article will create a back pressure of 1 inch water column to 10 psig. Ceramic wall flow substrates used in the system may be formed of a material having a porosity of at least 50% (e.g., from 50 to 75%) having a mean pore size of at least 5 microns (e.g., from 5 to 30 microns). When substrates with these porosities and these mean pore sizes are coated with the techniques described below, adequate levels of SCR catalyst compositions can be loaded onto the substrates to achieve excellent NOx conversion efficiency. These substrates are still able retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Suitable wall flow filters may be formed with lower wall porosities, e.g., from about 35% to 50%, than the wall flow filters utilized in the invention. In general, the pore size distribution of a suitable commercial wall flow filter is very broad with a mean pore size smaller than 17 microns.

The porous wall flow filter used according to embodiments of this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

To coat the wall flow substrates with a catalyst composition, the substrates are immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry typically permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 450° C.). After calcining, the catalyst loading can determined be through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

Reductant Injector

A reductant dosing system is optionally provided downstream of the soot filter and upstream of the SCR catalyst to inject a $NO_x$ reductant into the exhaust stream. As disclosed in U.S. Pat. No. 4,963,332, $NO_x$ upstream and downstream of the catalytic converter can be sensed, and a pulsed dosing valve can be controlled by the upstream and downstream signals. In alternative configurations, the systems disclosed in U.S. Pat. No. 5,522,218, where the pulse width of the reductant injector is controlled from maps of exhaust gas temperature and engine operating conditions such as engine rpm, transmission gear and engine speed. Reference is also made to the discussion of reductant pulse metering systems in U.S. Pat. No. 6,415,602, the discussion of which is hereby incorporated by reference.

Figure 8:
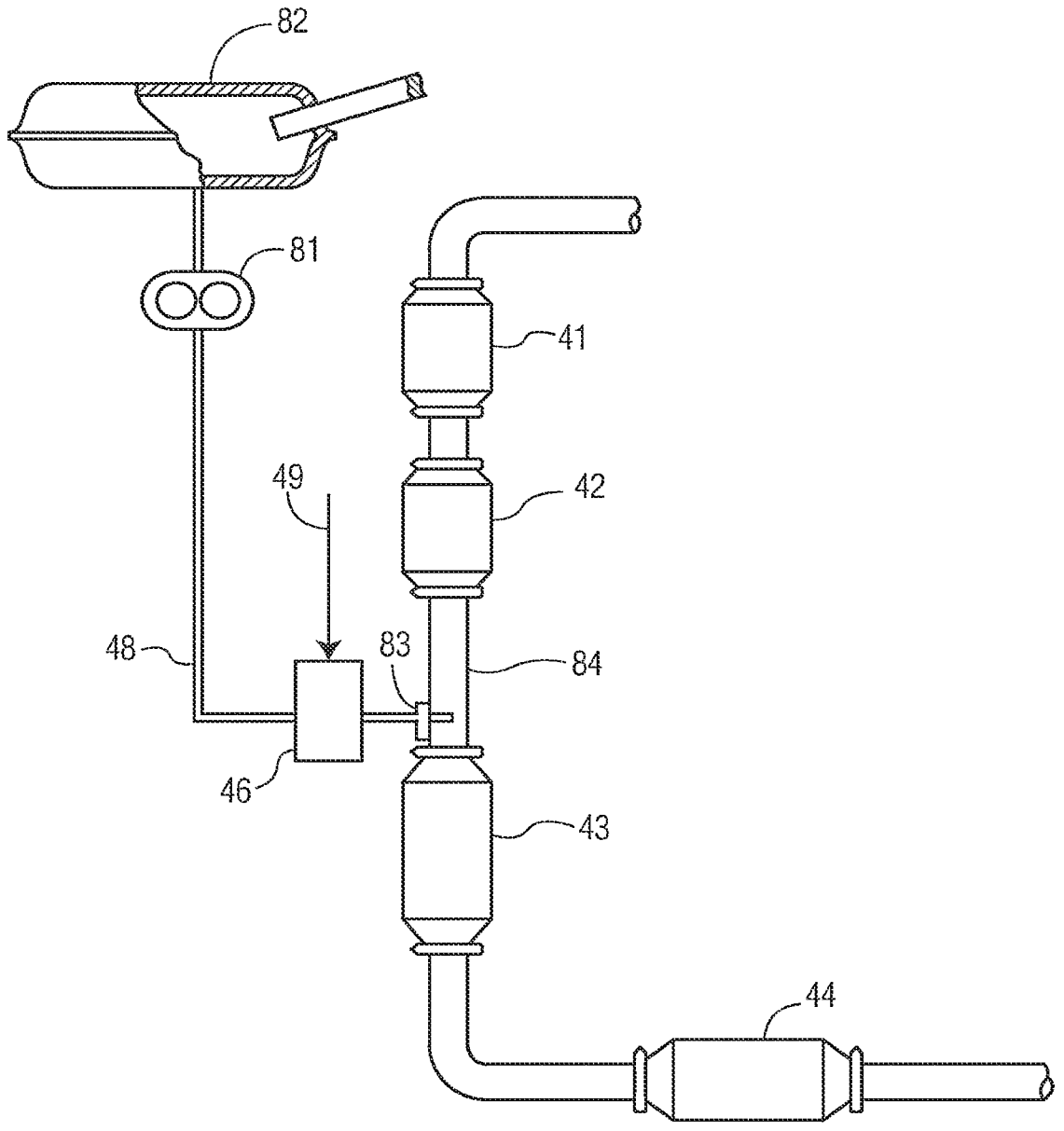
FIG. 8 shows an emission treatment system according to one embodiment of the invention that includes a urea reservoir and injector.

In the embodiment of FIG. 8, an aqueous urea reservoir 82 stores a urca/water solution aboard the vehicle which is pumped through a pump 81 including a filter and pressure regulator to a urca injector 46. Urea injector 46 is a mixing chamber which receives pressure regulated air on line 49 which is pulsed by a control valve to urea injector 46. An atomized urea/water/air solution results which is pulse injected through a nozzle 83 into exhaust pipe 84 upstream of the SCR catalyst 43.

This invention is not limited to the aqueous urea metering arrangement shown in FIG. 8. It is contemplated that a gaseous nitrogen based reagent may be utilized. For example, a urea or cyanuric acid prill injector can meter solid pellets of urea to a chamber heated by the exhaust gas to gasify the solid reductant (sublimation temperature range of about 300 to 400° C.). Cyanuric acid will gasify to isocyanic acid (HNCO) and urea will gasify to ammonia and HNCO. With either reductant, a hydrolysis catalyst can be provided in the chamber and a slip stream of the exhaust gas metered into the chamber (the exhaust gas contains sufficient water vapor) to hydrolyze (temperatures of about 150 to 350° C.) HNCO to produce ammonia.

In addition to urea and cyanuric acid, other nitrogen based reducing reagents or reductants especially suitable for use in the control system of the present invention includes ammelide, ammeline, ammonium cyanate, biuret, cyanuric acid, ammonium carbamate, melamine, tricyanourea, and mixtures of any number of these. However, the invention in a broader sense is not limited to nitrogen based reductants but can include any reductant containing hydrocarbons such as distillate fuels including alcohols, ethers, organo-nitro compounds and the like (e.g., methanol, ethanol, diethyl ether, etc.) and various amines and their salts (especially their carbonates), including guanidine, methyl amine carbonate, hexamethylamine, etc.

Additional embodiments of the invention are directed to methods method of treating an exhaust stream from a diesel engine comprising NOx and particulate matter. The method comprises flowing the exhaust stream through the catalyst compositions previously described. Briefly, a diesel oxidation catalyst having an inlet zone with a first loading of at least one of palladium and platinum and an outlet zone with a second loading comprising palladium. The first loading is greater than the second loading and the length of the first zone is no greater than the length of the second zone.

In specific embodiments, the exhaust gas is passed through a catalyst as previously described where the outlet zone contains substantially no platinum. The catalyst of detailed embodiments is effective to produce substantially no additional NO2 in the exhaust gas stream after passing through the catalyst over about 90% of the operating window of the catalyst. In other detailed embodiments, the catalyst is effective to produce substantially no additional NO2 in the exhaust gas stream after passing through the catalyst over about 70%, 75% 80%, 85%, 90% or 95% of the operating window of the catalyst. In some specific embodiments, the axial length of the inlet zone is about half the axial length of the outlet zone and the first loading is greater than about 60 $g/ft^3$ and the second loading is less than about 6 g/ft3.

EXAMPLES

Figure 9:
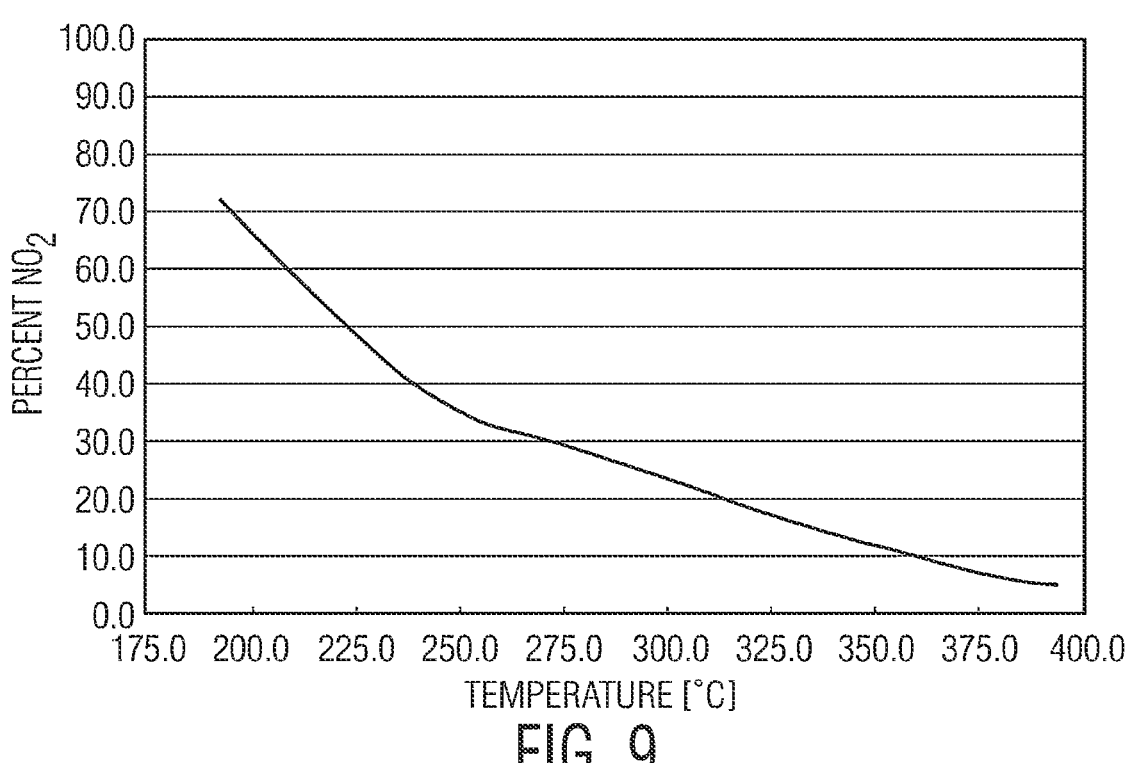
FIG. 9 shows a graph of the percentage of $NO_2$ in the $NO_x$ as a function of temperature.
Figure 10:
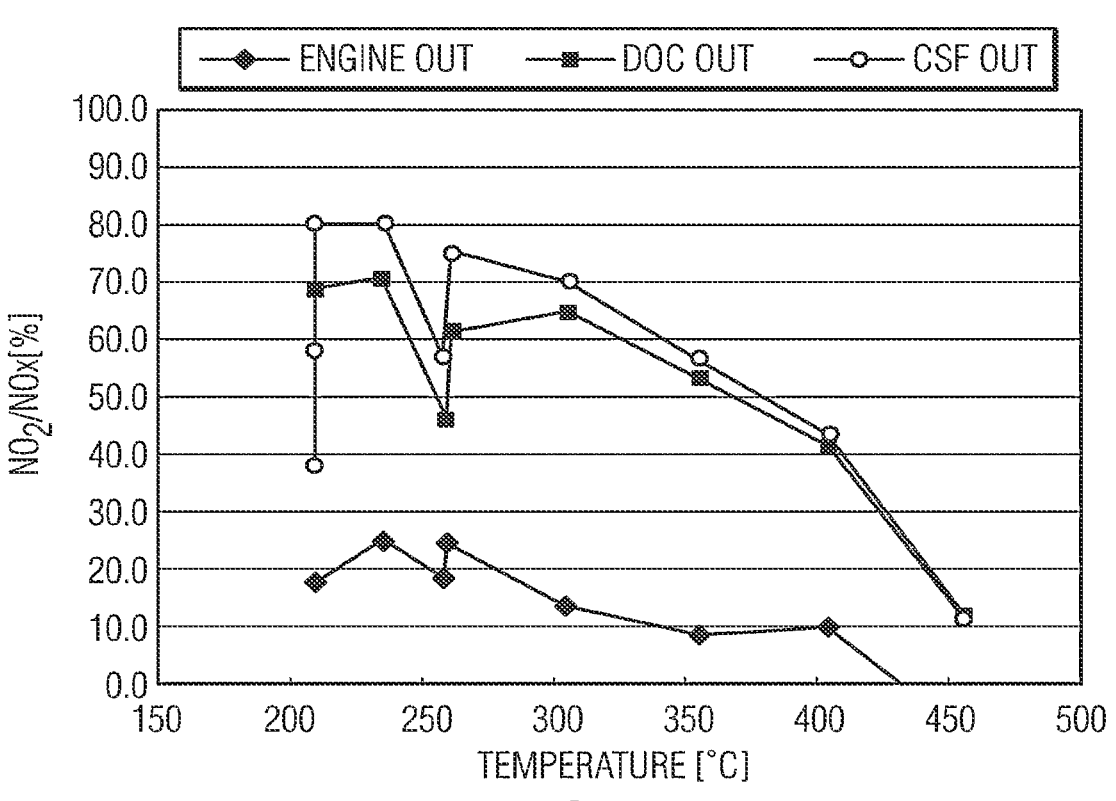
FIG. 10 shows a graph of the % $NO_2/NO_x$ as a function of temperature.
Figures 11, 12:
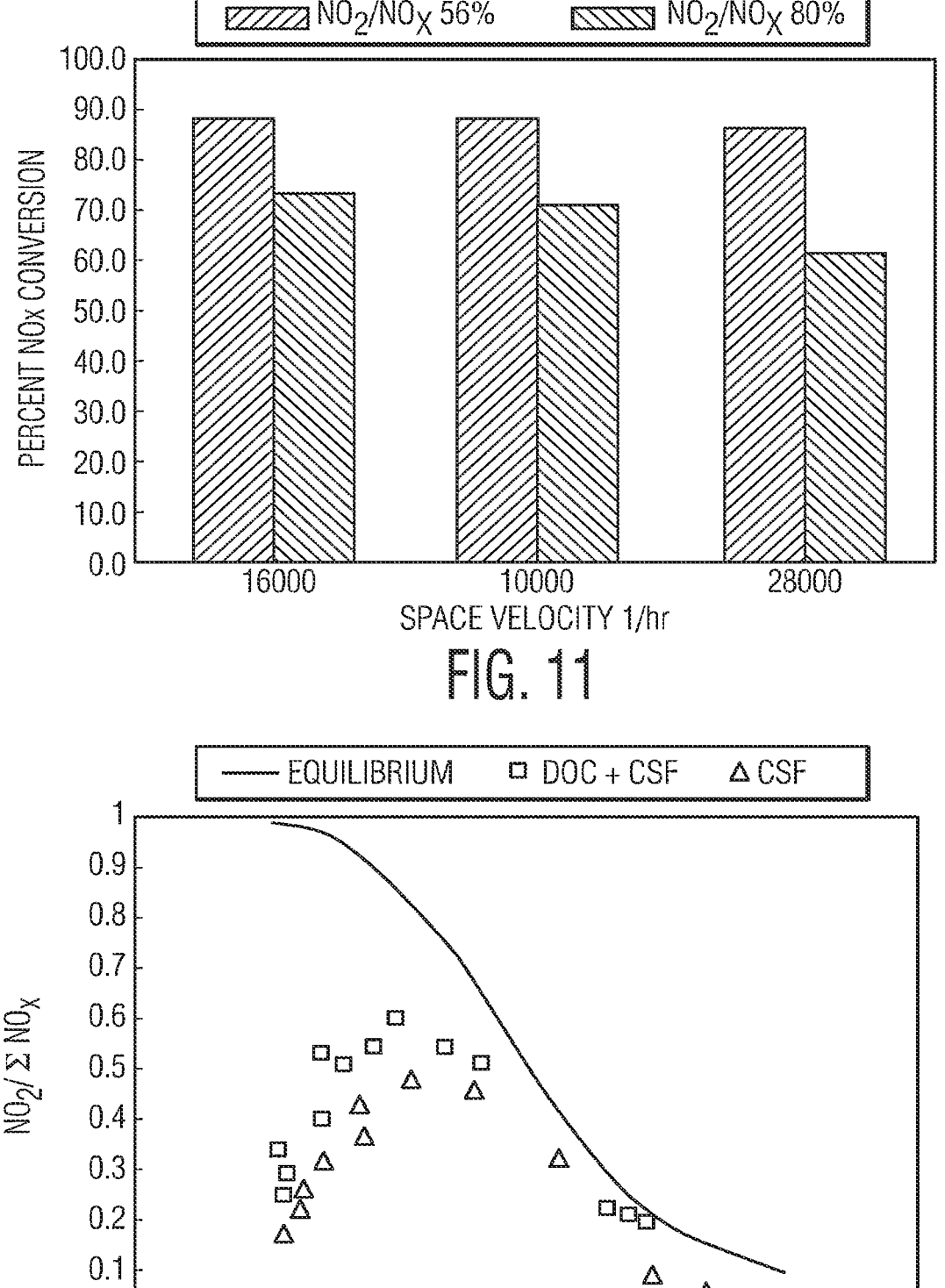
FIG. 11 shows a graph of the SCR performance relative to the $NO_2/NO_x$ ratio.
FIG. 12 shows a graph of the DOC contribution to the outlet $NO_2$ as a function of temperature.

Data shows that the engine out NO2 percentage of NOx can vary depending on the engine design, the exhaust temperature and the load. See FIG. 9. The optimal NO to NO2 ratio for improving the selective catalytic reduction reaction rate is 1:1 (50% concentration), it can be seen in the data in FIG. 10 that even the engine out NO2 can be above the optimal ratio. In the event the DOC is too active and contains a significant amount of platinum necessary for burning fuel for active regeneration and a CSF with platinum, the NO2 concentration often exceeds the optimal NO to NO2 (or NO2 to NO$_x$) ratio. See FIG. 10. This can be an issue because if the concentration of NO2 becomes too high, the NO$_x$ reduction reaction becomes inhibited. See FIG. 11, in which the lower NO$_x$ conversions shown as the shorter bars in the graph are produced when the NO2 to total NO$_x$ is 80%. However, under similar conditions, when the NO2 to total NO$_x$ ratio is 56%, the NO$_x$ conversion is higher.

Figure 13:
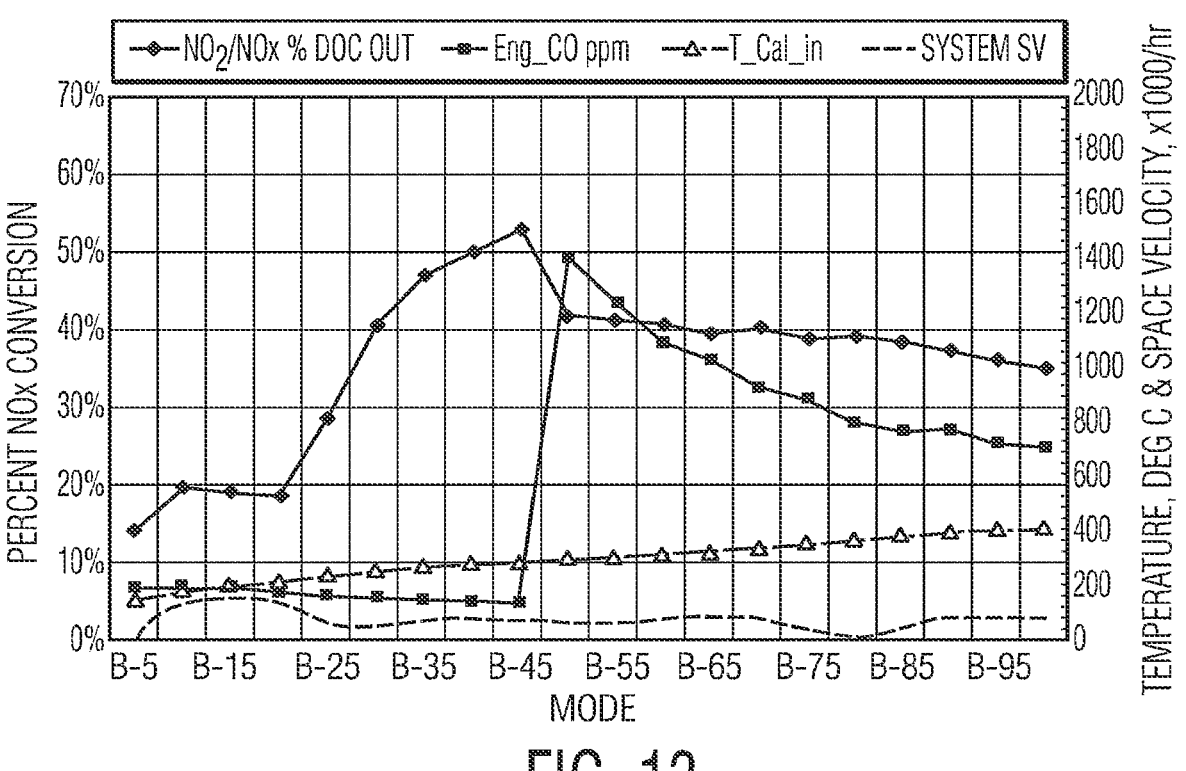
FIG. 13 shows a graph of the percentage of $NO_2$ in the $NO_x$ as a function of temperature.

Additionally, data has shown that the majority of NO2 available at the inlet of the SCR catalyst is produced in the CSF. See FIG. 12. In addition to having only a small effect on the overall amount of NO2 entering the SCR catalyst the NO2 out of the DOC can be affected by the engine out CO and HC concentrations. See FIG. 13.

Figure 14:
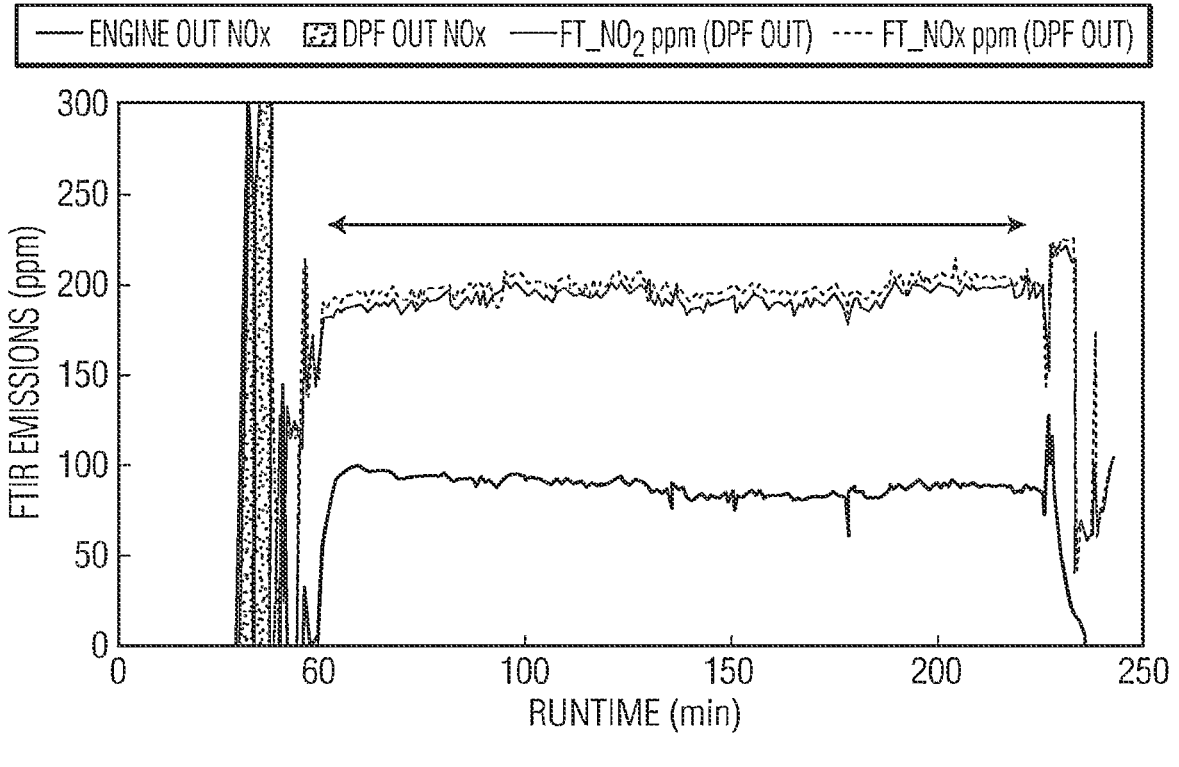
FIG. 14 shows a graph of the FTIR emissions as a function of time for a 3 hour soot-loading test.

Since the NO2 produced in the DOC must pass through the CSF and as the CSF builds a soot layer on the inlet channel walls, the NO2 generated by the DOC will react with the soot and revert back to NO. The extent of this reaction will be dependent on the thickness of the soot layer thus it will be variable. Therefore, the amount of NO2 generated by the DOC that actually makes it to the SCR is variable and unreliable. However, the generation of NO2 over the CSF is much more controllable because the DOC will have oxidized almost all of the HC and CO coming from the engine and the CSF PGM loading will drive the NO to NO2 toward equilibrium for the given conditions regardless of the amount of soot in the filter. See FIG. 14.

Figure 15:
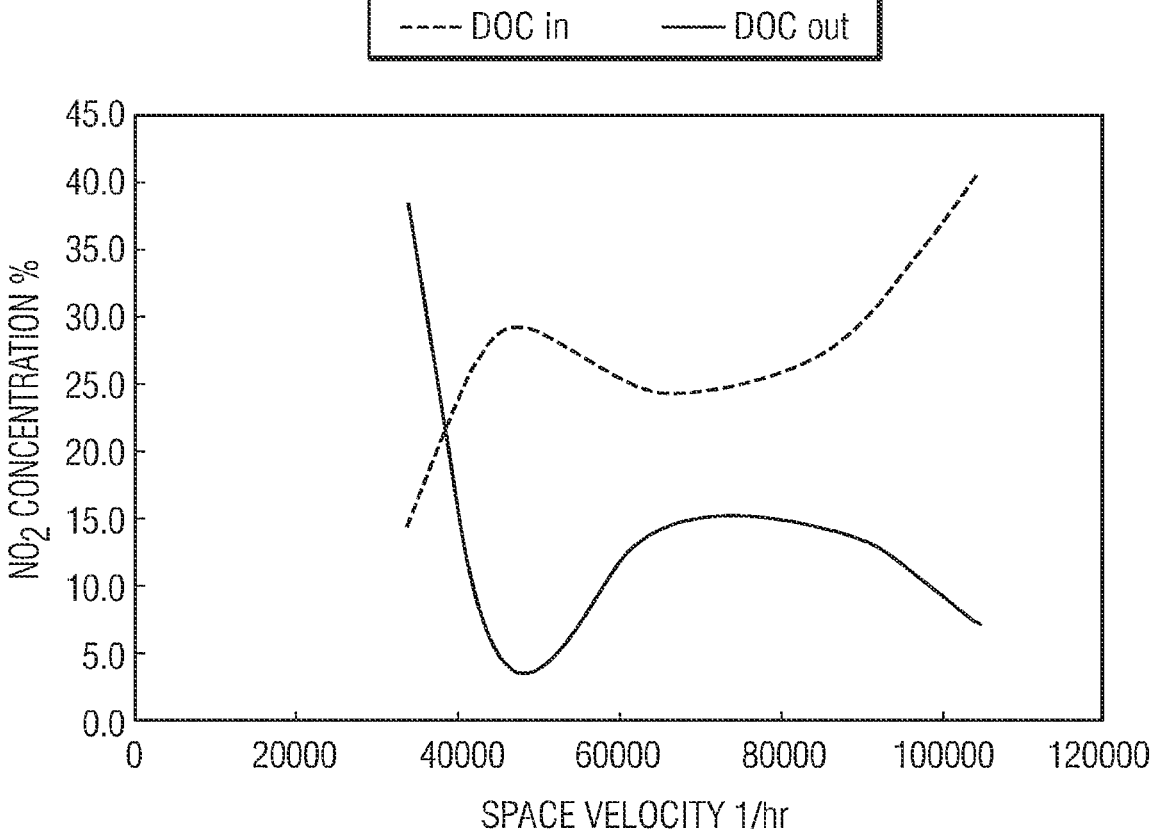
FIG. 15 shows a graph of the $NO_2$ conversion across the DOC at 275° C.

Embodiments of the invention are able to utilize a DOC that makes little or no NO2 compared to engine out in combination with an optimized CSF designed to provide the proper NO to NO2 ratio for optimal SCR operation. See FIG. 15.

A properly designed DOC can be configured to contain a catalyst that is effective produce little or no NO2 compared to the engine out emissions. See Table 1 and FIG. 11.

This design offers many benefits, including the opportunity for lower Pt loading on the DOC, reducing the cost. The opportunity to increase the use of Pd on the DOC, increasing the Pd to Pt ratio, improving the thermal durability of the DOC. Allowing a more stable NO to NO2 ratio into the filter. Allowing better utilization of the system PGM by placing more PGM and more Pt on the filter. Allowing for the optimization of the filter for NO2 production for the SCR which creates a system that is amore able to provide the optimal NO to NO2 ratio for proper SCR operation.

Comparative Example

A standard diesel oxidation catalyst was prepared using a 10.5"×6.0" cylindrically shaped substrate with 300 cells per square inch and 5 mil wall thickness. The substrate was coated with a 10:1 platinum to palladium washcoat with a loading of 40 g/ft$^3$. The substrate was zoned 50:50 over the axial length of the substrate. The loading in the inlet zone was 55 g/ft$^3$ and the outlet zone loading was 25 g/ft$^3$.

Low NO2 Example

A substrate identical to that of the Comparative Example was zone washcoated. The inlet zone was 2" long and contained platinum and palladium at a ratio of 10:1 with a loading of 80 g/ft3. The outlet zone was the remaining 4" of the substrate and was washcoated with substantially only palladium with a loading of 5 g/ft3. The total loading for the Low NO2 sample was 30 g/ft3 with an overall platinum to palladium ratio of 4.2:1.

Figure 16:
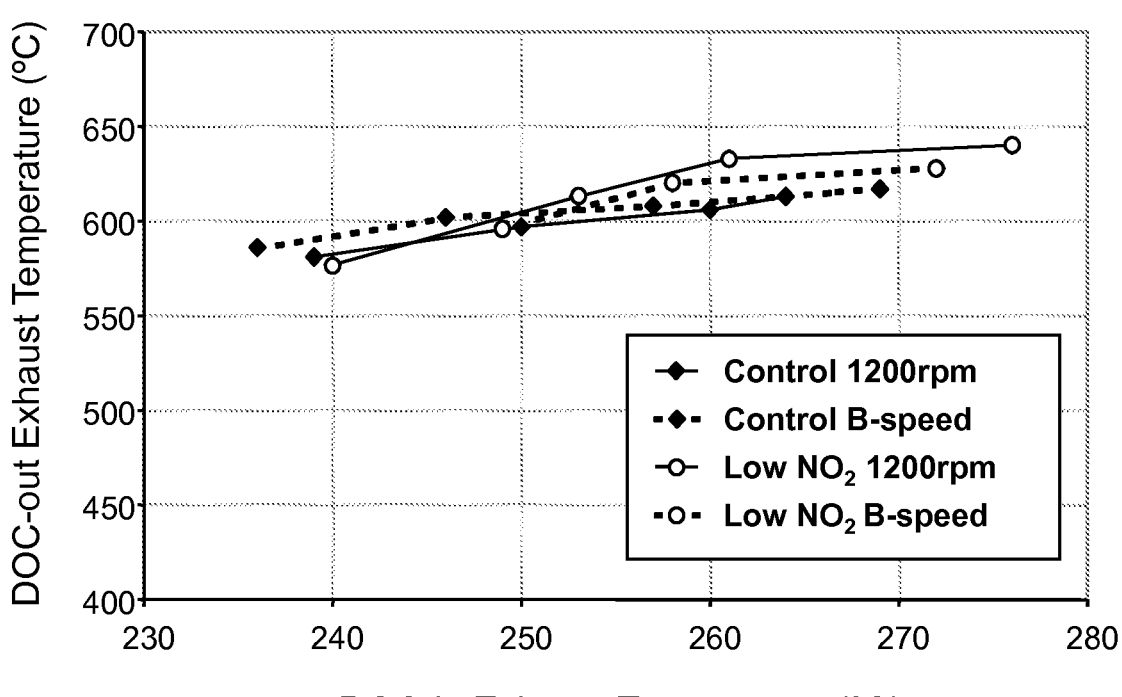
FIG. 16 shows a graph of the exhaust temperature exiting the DOC as a function of the exhaust temperature entering the DOC measured at two engine speeds.

FIG. 16 shows a graph of the temperature exiting the DOC as a function of the temperature entering the DOC. This graph demonstrates that the temperature of the exhaust exiting the DOC increased with increasing temperature entering the DOC. The data was evaluated at two engine speeds, 1200 rpm and B-speed. The Low-NO2 DOC performed comparably to the Comparative Example. The distribution of metal with high loading in the upstream end and

TABLE 1

| Steady State Point | SV x000 hr$^{-1}$ | Temp ° C. | Engine Out (ppm) | | | | DOC out | | |
|---|---|---|---|---|---|---|---|---|---|
| | | | NO$_x$ | NO$_2$/NO$_x$ | HC | CO | NO$_2$/NO$_x$ | % HC Conv | % CO Conv |
| 1 | 87 | 510 | 412 | 0.073 | 59 | 413 | 0.095 | 69.9 | 97.6 |
| 2 | 64 | 530 | 336 | 0.08 | 50 | 472 | 0.065 | 72.1 | 99.1 |
| 3 | 38 | 430 | 217 | 0.158 | 152 | 1054 | 0.2 | 90.1 | 99.8 |
| 4 | 29 | 384 | 214 | 0.179 | 240 | 994 | 0.302 | 92.9 | 99.8 |
| 5 | 20 | 270 | 231 | 0.252 | 274 | 1229 | 0.398 | 94.5 | 99.9 |
| 6 | 20 | 260 | 122 | 0.384 | 410 | 1721 | 0.275 | 94.6 | 99.9 |
| 7 | 19.3 | 195 ± 5 | 278 | 0.111 | 217 | 235 | 0.075 | 77 | 99.8 |

The optimization of the DOC according to one or more embodiments includes the utilization of platinum group metals such as platinum and palladium in appropriate ratios, loadings and distribution on the substrate to optimize HC and CO conversion and active regeneration of the filter while making little or no NO2. This optimization will allow the removal of Platinum (the primary catalyst for making NO2) from the DOC thus reducing the overall cost of the DOC. This allows more platinum to be utilized on the CSF where it will give the most benefit for generating NO2 for the SCR.

the low loading in the downstream end did not affect the temperature out of the DOC, meaning that light-off of fuel is not significantly affected.

Figure 17:
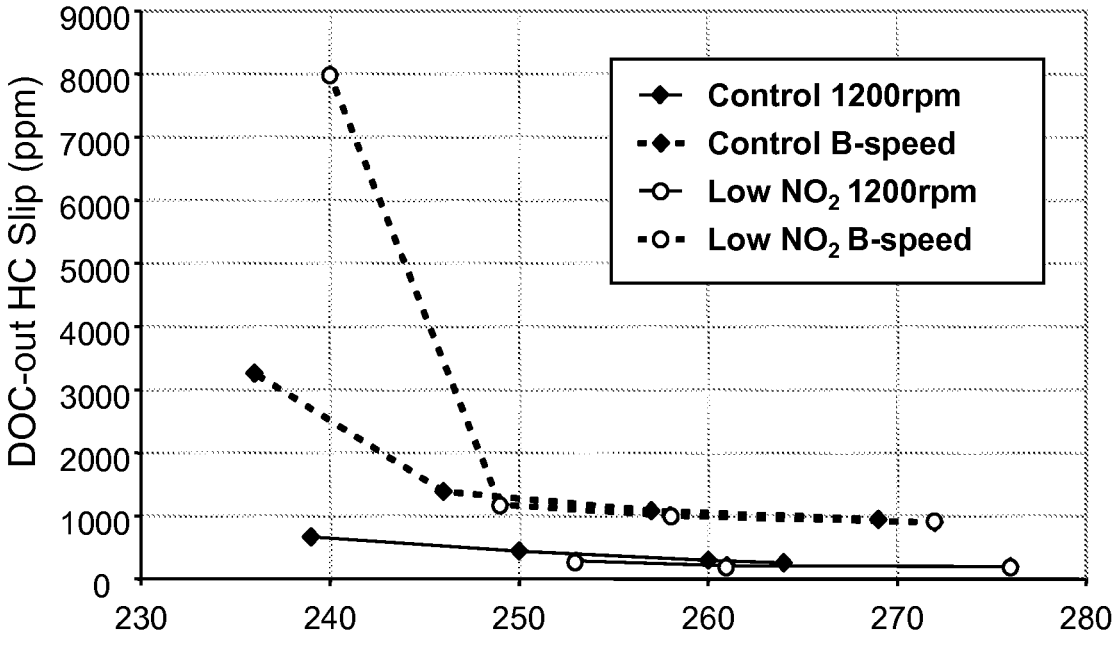
FIG. 17 shows a graph of the concentration of hydrocarbon slipped from the DOC as a function of the exhaust temperature entering the DOC measured at two engine speeds.

FIG. 17 shows a graph of the concentration of hydrocarbons slipped from the DOC as a function of the exhaust temperature entering the DOC. The data was evaluated at two engine speeds, 1200 rpm and B-speed. The Low NO2 DOC performed equivalently to the Comparative Example down to a temperature of about 250° C. The precious metal loading was less for the Low NO2 DOC, accounting for the higher HC slip at low temperatures.

Figure 18:
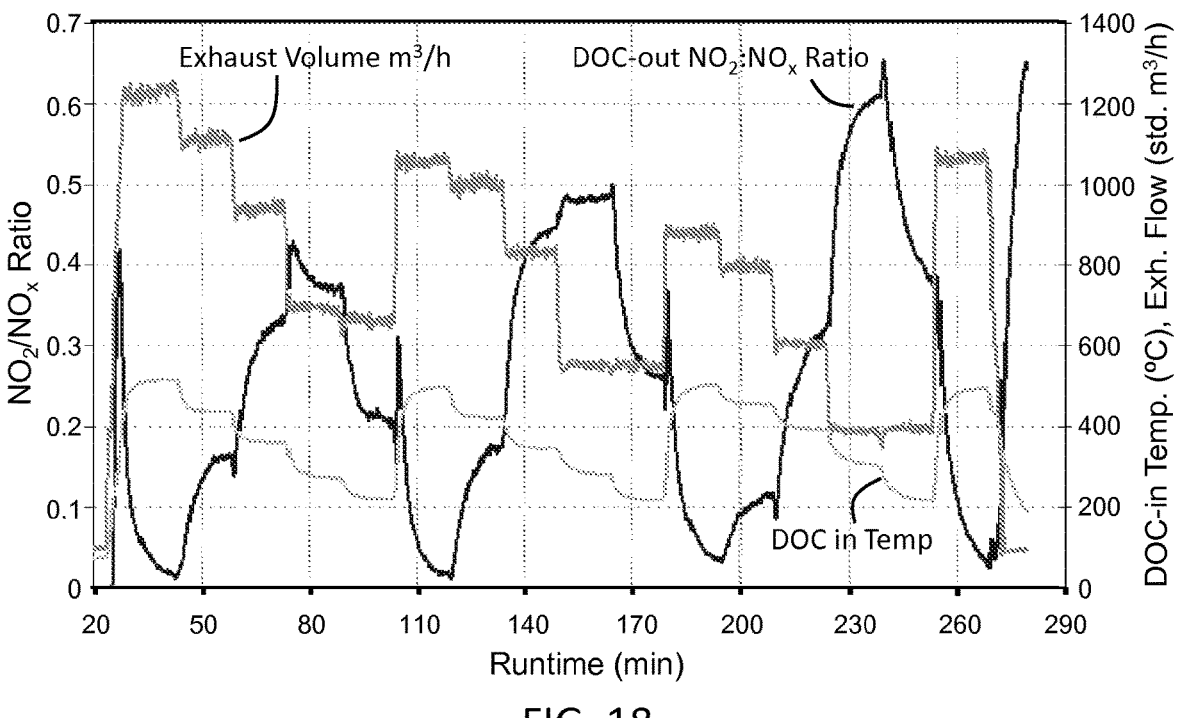
FIG. 18 shows a graph of the $NO_2/NO_x$ ratio exiting a conventional DOC as a function of time.
Figure 19:
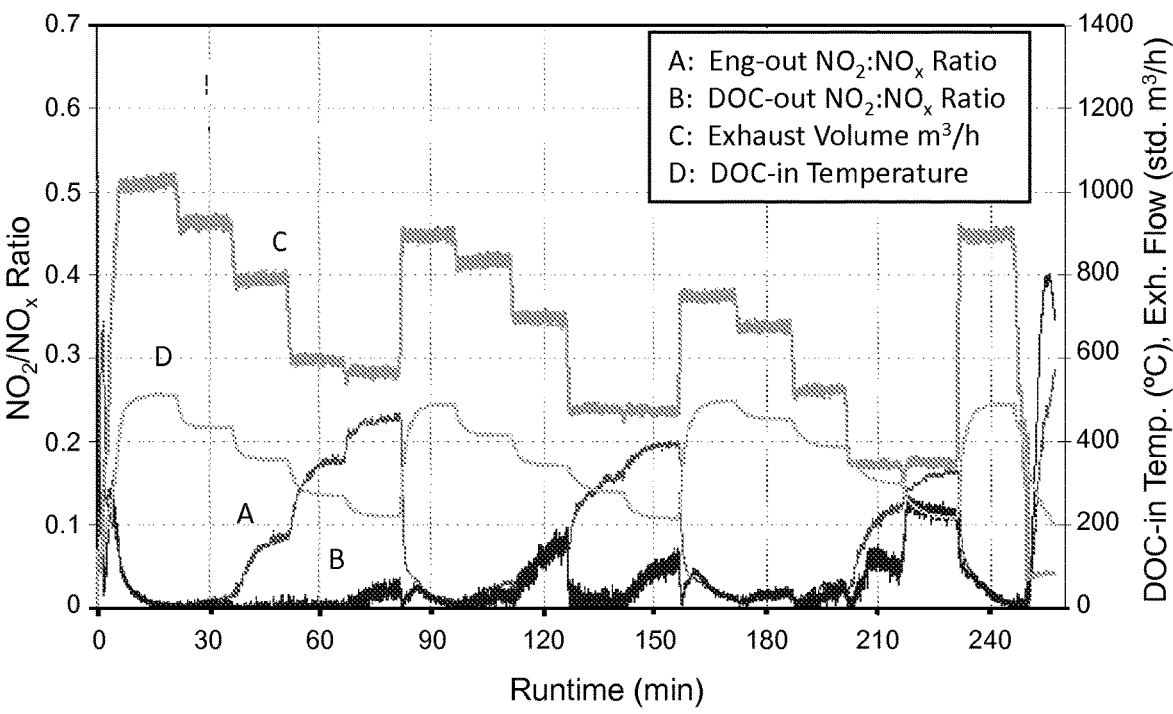
FIG. 19 shows a graph of the $NO_2/NO_x$ ratio exiting the engine and a DOC according to an embodiment of the invention as a function of time.

FIGS. 18 and 19 show graphs of the NO2/NO$_x$ ratio as a function of runtime for the Comparative Example and the Low NO2 DOC, respectively. The DOC-out ratio for the Comparative Example fluctuated greatly between about 0 and 0.6 over the runtime. The DOC-out ratio for the Low NO2 DOC fluctuated between about 0 and about 0.1 throughout the runtime. FIG. 19 also shows that the NO2/NO$_x$ ratio exiting the engine fluctuated between about 0 and about 0.2 throughout the runtime, with much larger variations than after the Low NO2 DOC. Thus, the low NO2 DOC has a much lower NO2/NO$_x$ ratio than the Comparative Example, plus the NO2/NO$_x$ ratio is at or well below engine out over the entire run sequence.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While the foregoing is directed to embodiments of the present invention, other and further embodiments of the invention may be devised without departing from the basic scope thereof, and the scope thereof is determined by the claims that follow.

What is claimed:

1. A system for treating an exhaust stream comprising NOx from an engine, the system comprising:

a diesel oxidation catalyst comprising an inlet zone with an axial length and an outlet zone with an axial length, the inlet zone comprising platinum and palladium in a ratio of equal to or greater than 2:1 in a first loading of at least 75 g/ft$^3$, the outlet zone comprising palladium and no platinum in a second loading of no greater than 10 g/ft$^3$, and the axial length of the inlet zone being less than or equal to the axial length of the outlet zone, wherein the diesel oxidation catalyst is configured such that no more than 25 ppm increase in the NO$_2$ produced over about 90% of the operating window of the diesel oxidation catalyst, and wherein the inlet zone or the outlet zone comprises a base metal that is an oxide of a rare earth metal;

a catalyzed soot filter disposed downstream from the diesel oxidation catalyst, the catalyzed soot filter comprising an oxidation catalyst composition on the filter, wherein the oxidation catalyst composition with platinum group metals loading on the filter is configured to produce NO$_2$ to optimize a ratio of NO to NO$_2$ exiting the filter; and a NO$_x$ reducing catalyst located downstream from the catalyzed soot filter.

2. The system of claim 1, wherein the oxidation catalyst composition comprises a higher loading of platinum group metals than present on the diesel oxidation catalyst.

3. The system of claim 1, wherein the oxidation catalyst composition comprises a higher loading of platinum than present on the diesel oxidation catalyst.

4. The system of claim 1, wherein one or more of the inlet zone and the outlet zone further comprises rhodium.

5. The system of claim 1, wherein one or more of the inlet zone and the outlet zone further comprises ceria.

6. The system of claim 1, wherein the inlet zone and the outlet zone comprise less than about 5% of other metals than palladium.

7. The system of claim 1, wherein the diesel oxidation catalyst is disposed on a flow-through substrate.

8. The emission treatment system of claim 1, wherein the NO$_x$ reducing catalyst is a selective catalytic reduction (SCR) catalyst.

9. The emission treatment system of claim 8, wherein the SCR catalyst comprises a zeolite promoted by a promoter metal selected from iron, copper, or both iron and copper.

10. The emission treatment system of claim 9, wherein the promoter metal is present in an amount of from 0.1 to 30 percent by weight based on total weight of promoter metal plus zeolite.

11. The emission treatment system of claim 1, further comprising a reductant injection system between the catalyzed soot filter and the NO$_x$ reducing catalyst.

12. The emission treatment system of claim 1, further comprising an ammonia oxidation catalyst disposed downstream from the NO$_x$ reducing catalyst.

13. The emission treatment system of claim 12, wherein the ammonia oxidation catalyst comprises a catalyst composition comprising at least one base metal and less than 0.5 wt. % platinum.

* * * * *